June 29, 1971 L. POTH 3,589,873
METHOD OF AND ASSEMBLY FOR THE JOINING OF ELEMENTS
OF DIFFERENT MATERIALS
Original Filed March 23, 1965 2 Sheets-Sheet 1
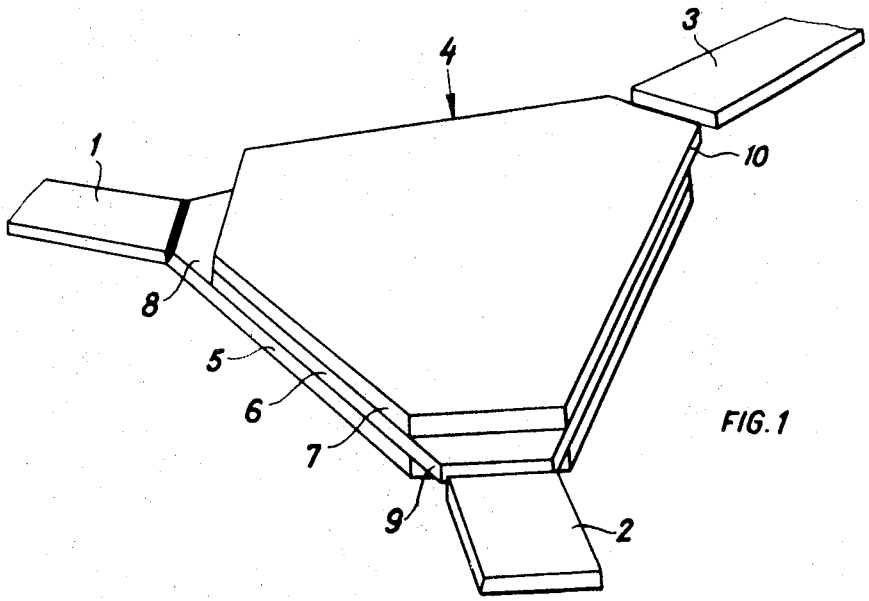
FIG. 1
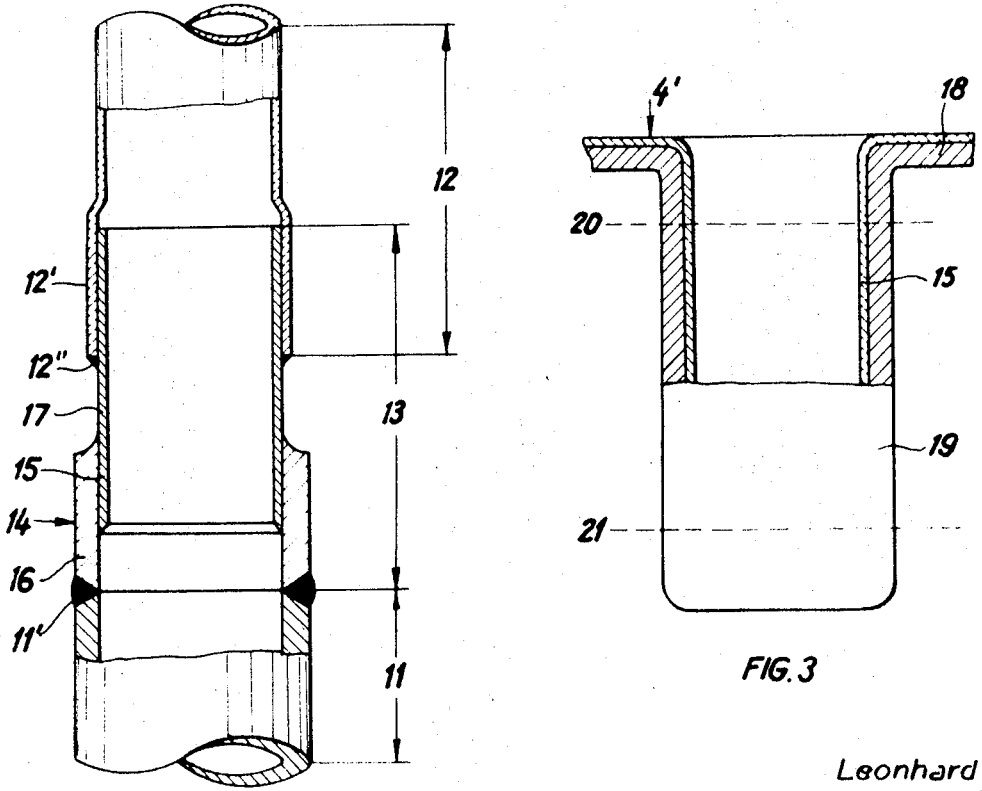
FIG. 2
FIG. 3
Leonhard Poth
INVENTOR
BY
Karl F. Ross
Attorney June 29, 1971  L. POTH  3,589,873
METHOD OF AND ASSEMBLY FOR THE JOINING OF ELEMENTS
OF DIFFERENT MATERIALS
Original Filed March 23, 1965  2 Sheets-Sheet 2

Leonhard Poth
INVENTOR.

BY Karl F. Ross
Attorney

3,589,873
METHOD OF AND ASSEMBLY FOR THE JOINING OF ELEMENTS OF DIFFERENT MATERIALS
Leonhard Poth, Pullach, Isartal, Germany, assignor to Linde Aktiengesellschaft, Wiesbaden, Germany
Original application Mar. 23, 1965, Ser. No. 442,317. Divided and this application Sept. 3, 1968, Ser. No. 775,217
Claims priority, application Germany, Mar. 25, 1964, G 40,198
Int. Cl. B32b *15/00*
U.S. Cl. 29—191                                    6 Claims

ABSTRACT OF THE DISCLOSURE

Flat or tubular elements of difficultly bondable materials are joined together with the aid of a transition piece in which layers of these materials are bonded to one another, each layer projecting beyond the remaining layer or layers at one or more locations at which it is welded or otherwise fused to the corresponding element.

---

This application is a division of application Ser. No. 442,317, filed Mar. 23, 1965, now abandoned.

The present invention relates to joining together difficultly bondable materials and especially for connecting elements which cannot be readily fused, welded or soldered together in a direct manner.

It has long been considered a problem in the field of metal working that certain metals could not be bonded together readily by the usual fusion, welding or soldering techniques. Thus, various metals could not be welded directly to aluminum or copper, for example, unless considerable effort was employed to pretreat the bodies or otherwise render them amenable to direct welding. Other combinations of metals also evidenced this difficulty and it has hitherto been necessary, in many cases, to provide the elements to be joined with flanges or connecting portions which were then bolted or riveted together. In the connection of pipes of difficultly bondable materials, for example, the ends of the pipes to be joined are formed with flanges interconnected by bolts and of a relatively massive character, especially for large pipes. Not only are such arrangements disadvantageous because of the complexity of the connecting portions of the elements, but the very nature of the junctions prevents facile and secure sealing of a pipeline assembly in this fashion when the fluid is under considerable elevated pressures or the pipe is subjected to highly reduced pressures. In some cases, the materials to be joined are not only difficult to bond with one another but relatively expensive so that the provision of massive junction formations and fittings at the ends of the elements is accompanied by considerable expense. Moreover, the special welding and soldering methods previously required for joining metals of the character described involve a good deal of expense and considerable labor, while nevertheless being unsatisfactory for many other reasons.

An object of this invention is to provide an improved assembly whereby elements of different materials, generally including at least one metal, can be joined together to form a firm junction in spite of the fact that direct soldering or welding of the elements may be precluded by the nature of the materials from which they are composed.

Another object of the present invention is to provide a low-cost transition element adapted to interconnect two elements of different materials.

These objects and others which will become apparent hereinafter are attained, in accordance with the present invention, by joining a plurality of elements of difficultly bondable materials together which comprises the steps of removing from spaced junction zones of a laminated body, having superposed layers of materials compatible with the materials of the different elements, the non-compatible layers so as to permit only the corresponding compatible layer to project from the body, and bonding to this projecting portion of the compatible layer the respective element. It will be evident, therefore, that an important feature of the present invention resides in the formation of the transition body by laminating a plurality of layers together (e.g. by the rolling, pressing, explosive-bonding techniques conventionally employed for the formation of composite laminar structures and the coating of one material with another). It has been found, in this connection, that thermal methods can be employed to connect the several elements with the respective layers at the respective junction zones without affecting the bonds between the layers or otherwise causing damage to the transition body when the layers, other than the one to be joined to each element at the respective transition zone, are cut back or removed to provide a gap between these other layers and the region at which the corresponding layer is secured to each element.

The multilayer body interconnecting two or more elements, according to the present invention, can be formed from materials which are each compatible with the material of a respective one of these elements to the extent that thermal methods (e.g. welding and soldering) can be readily employed to join the corresponding layer with their elements; for the most part, however, it has been found desirable that the materials of the layers correspond to the materials of the respective elements so as to be substantially identical therewith.

According to a more specific feature of this invention, the transition body is produced by laminating the several layers into a sheet-like structure which can be cut, stamped, or punched into any desirable flat configuration. For this purpose, this body may have its junction zones at its corners while the layers other than the one to be joined to the element are cut back or removed as suggested earlier. When the transition body is to have a shape other than that of a flat plate, it can be shaped by pressing, spinning, deep-drawing or the like from such plate, preferably so as to be essentially seamless. Composite plates of this character are commercially available for almost all of the materials of primary interest in connection with the present method and assembly. These plates may be held together with the aid of special cementitious materials or by virtue of pressure bonding. For example, U.S. Patent No. 3,137,937, issued June 23, 1964, describes the formation of composite metallic bodies by various methods. Of most interest for the purpose of the present invention are the methods involving the rolling and pressing of coherent layers of the metals together and the explosive-bonding technique, constituting the principal subject matter of said patent. When reference is made hereinafter to clad plates, it will be understood that plates of the type produced by roll-coating, press-coating, explosive-coating and adhesive methods are intended although, for certain materials, the laminated structure can be formed by hot dipping, electroplating and vapor deposition according to the present invention. While multilayer bodies of shapes other than flat are, according to this invention, preferably formed from the platelike bodies, it is also possible to employ semifinished or partly fabricated and shaped body having at least a portion along which a plurality of layers have been laminated together.

According to an important feature of the present invention, when the body consists of two or more metallic layers, such layers are composed predominantly of different materials which are, however, selected from the group of iron, aluminum and copper. Thus either the base metal or the substrate can consist of iron, aluminum, copper or their alloys while one or more laminating layers, which are generally of a thickness considerably less than that of the substrate, can be employed of one or more of the remaining metals of this group. Generally, however, metals with which the present invention may be employed include nickel, titanium, molybdenum, tantalum, chromium, zirconium, zinc, tin and their alloys.

According to still another feature of this invention, the described method is applied to the joining of chromium-nickel alloy steel and aluminum. It has, however, long been a problem in the field of low-temperature technology (cryoscopic processes, liquefaction of gases, etc.) to connect tubes of 18/8 chromium-nickel alloy steel with tubes consisting predominantly of aluminum, titanium and tantalum. Since such metals cannot be joined together by direct welding, flanges have hitherto been required; the connection of such alloy-steel tubes, appliances, and equipment in pipelines of aluminum or titanium, for example, is a common use and, by application of the principle of the present invention, considerable savings can be gained. Additional uses of the present invention in joining aluminum to alloy steels are to be found, for example, in the attachment of aluminum pipes to transport vessels for liquid gas; in this case, the present invention permits the elimination of flanges whose heat dissipation is undesirable. In the construction of chemical and nuclear reactors, it is not uncommon to connect aluminum tubes in the interior of the reactor with chromium-nickel alloy steel tubes which, because of their relatively reduced thermal conductivity, can be provided advantageously on the exterior of the reactor.

The above and other objects, features and advantages of the present invention will become more readily apparent from the following description, reference being made to the accompanying drawing in which:

FIG. 1 is a perspective view of a plate-like transition body and the elements connectable therewith;

FIG. 2 is an elevational view, partly broken away, of a junction assembly according to the present invention;

FIG. 3 is an elevational view, partially in section, showing a step in the manufacture of the transition body of FIG. 2;

Figure 4C:
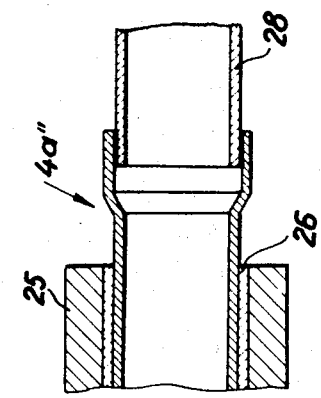
FIGS. 4A through 4C are cross-sectional views taken along lines IVA—IVA, IVB—IVB, and IVC—IVC of FIG. 4.

In FIG. 1 of the drawing, I show an assembly for the interconnection of three elements 1, 2, 3 composed of different materials and not readily bondable together by conventional means. One of these elements (e.g. element 1) can be composed, for example, of an aluminum alloy such as Al-Mg-3 while another of the elements (e.g. bar 2) can be composed of nickel-chromium alloy steel (18/8 CrNi steel). The third bar 3 can be composed of another material, e.g. titanium, tantalum or copper.

The three bars 1, 2 and 3 can be joined together, according to the present invention, with the aid of a transition body 4 consisting of layers 5, 6 and 7 of materials compatible with and readily bondable to the bars 1, 2 and 3, respectively. The body 4 can thus consist of a layer 5 on an aluminum alloy identical with that of bar 1 or a compatible alloy predominantly of aluminum, the layer 6 of a CrNi steel identical with that of bar 2, and the layer 7 of titanium, tantalum or copper, depending upon the composition of bar 3. The laminated body 4 can be produced by pressing, rolling or explosive bonding as, for example, described in U.S. Patent No. 3,137,937 and is formed with connecting junctions 8, 9 and 10 by cutting back or removing the layers 6 and 7 from the junction 8, removing the layers 5 and 7 from the junction 9, and cutting back the layers 5 and 6 from the junction 10 to permit only the layer of a material corresponding to that of the associated element to project beyond the body. The removal of the layers can be effected by chemical means (e.g. etching) when care is taken to mask the areas which should remain unaffected, by mechanical means (e.g. grinding, milling, shaping or other machining), or by any other technique capable of stripping back the noncompatible layers from each of the junction zones. According to an important characteristic of the present invention, the noncompatible layers are set back by a distance sufficient to render them unaffected by the subsequent bonding operation. This operation, by which each of the elements 1, 2 and 3 is joined with the respective layers 5, 6 and 7 at the junction zones 8, 9 and 10, is preferably a thermal technique such as welding or soldering so that the stripping of the noncompatible layers should be effected to a distance sufficient to prevent distortion or damage to the remainder of the transition body by the heat and bonding materials involved. While the assembly of FIG. 1 can be formed by buttwelding the elements to their respective junction zones, generally with the deposition of a weldment deposited between the elements and their respective layers, it should be understood that lap-welding (e.g. with deposition of weldment or resistance-welding) and soldering can also be employed.

In FIG. 2, there is shown a pipe assembly wherein an 18/8 CrNi steel pipe 12, which is enlarged at 12′, is connected with an aluminum pipe 11. The transition body 13 is, in this case, a relatively short tube of aluminum-clad steel from which the noncompatible materials have been removed at the opposite ends of the body to permit connection of pipes 11 and 12. As illustrated in FIG. 3, the tube 13 of FIG. 2 is formed by deepdrawing a plate 4′, composed of the laminated layers 15 and 18 of CrNi-alloy steel and aluminum, respectively, to form a seamless cup-shaped body 19. The latter is severed at axially spaced locations 20, 21 to form an aluminum-clad nipple from which the aluminum is removed at one end by turning in a lathe while the steel layer is set back at the other end by internal boring. The resulting body 13 has a junction zone 17 of alloy steel 15 which is received within the enlargement 12′ of pipe 12 and is lapwelded thereto by a weldment 12″. Similarly, the junction zone 16 of the aluminum layer 14 extends beyond the laminated regions of the body 13 and is buttwelded to pipe 11 by the annular deposition of a weldment 11′. It will also be apparent that, instead of a weldment 12″, the interfitting layer and pipe of alloy steel can be sweat-soldered together in a conventional manner. The regions 16 and 17 are each of a length sufficient to prevent damage to the other layer by the welding or soldering operations. The assembly illustrated in FIG. 2 is useful for many purposes and can be employed, for example, for attaching CrNi-steel bodies and appliances to aluminum pipe lines.

EXAMPLE

The assembly shown in FIG. 2 is made in the manner described above with a transition body in the form of a tube having a diameter of about 40 mm. The wall thickness of the tube is approximately 2.4 mm. with the aluminum layer, composed of an AlMn alloy (German Industrial Standard DIN 1725–ASA H 35.1), having a thickness of 2.0 mm. The alloy-steel layer is composed of 18.8 CrNi-alloy steel and has a thickness of 0.4 mm. The transition body is formed by deepdrawing and machining in such manner that the steel layer (i.e. the layer having the higher tensile strength) is in the interior of the body. It has been found that deepdrawing of the transition bodies in this manner prevents damage to the composite body during such deformation. The pipe 12 was an 18/8 CrNi-steel tube while the pipe 11 was composed of the aluminum alloy Al-Mg-3. The assembly was tested at room temperature to determine its sealing effectiveness against helium which was found to be less than $5 \times 10^{-10}$ torr. liters/second. The sealing efficiency was not reduced when the assembly was subjected to temperature stresses whereby the assembly was twice heated with a Bunsen flame to a temperature of about 200° C. alternating with four periods of cooling in liquid nitrogen. The length of the connecting piece 13 was somewhat in excess of 25 mm. The steel layer was stripped back by approximately 20% of the length of the transition body while the aluminum layer was set back somewhat in excess of 50% thereof.

Figure 4B:
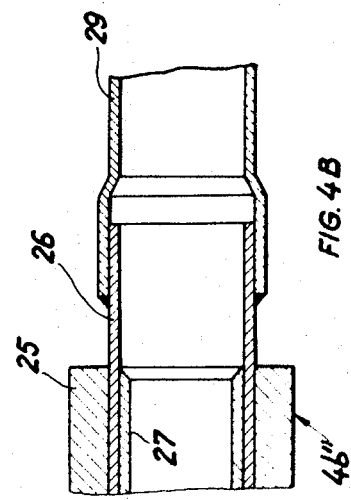
Figure 4:
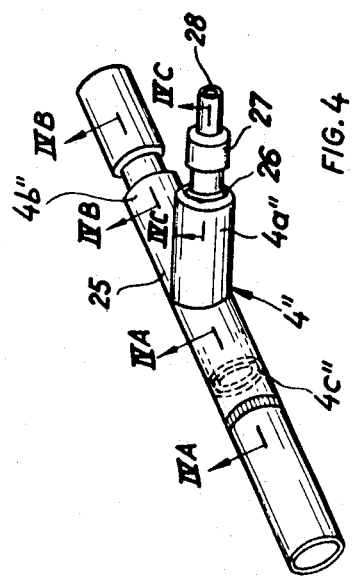
FIG. 4 is a perspective view of a three-way pipe-connection assembly, according to this invention.

In FIG. 4, I show a three-way pipe connection in which the transition body 4'' is a pipe T of aluminum alloy 25, a CrNi steel 26 and copper 27. At the extremity 4a'', the aluminum and steel outer layers are stripped back to form a junction zone of copper into which the pipe 28 is inserted (FIG. 4C) and is sweat-soldered in the manner in which copper tubing is generally joined. At another extremity 4b'' the outer layer 26 of aluminum and the inner layer 27 of copper are set back so that a junction zone only of steel extends beyond the remainder of the body. A steel-alloy pipe 29 is lapwelded thereto as best seen in FIG. 4B.

Figure 4A:
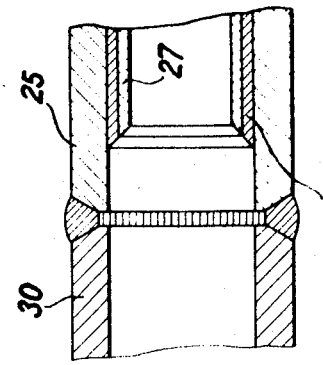

At the remaining extremity 4c'', the copper and steel inner layers are set back while the aluminum layer 26 is butt-welded to an aluminum pipe 30 (see FIG. 4A).

Figure 5:
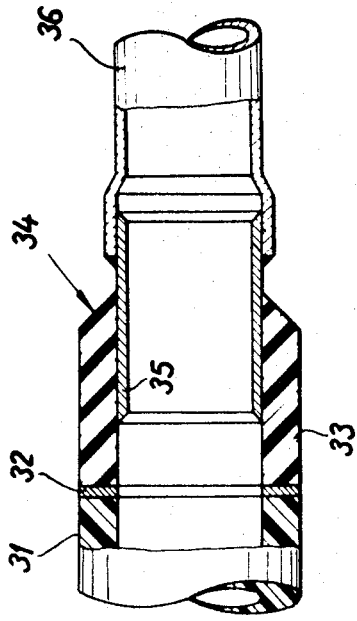
FIG. 5 is a view similar to FIG. 2 illustrating another embodiment of the invention.

In FIG. 5, there is illustrated an assembly wherein a synthetic-resin pipe 31 (e.g. of polyethylene) is heat-sealed or welded at 32 to a synthetic resin layer 33 of a transition body 34, a metal layer 35 being set back from the junction zone 32 as previously described. At the projecting extremity, from which the synthetic resin is set back, a metallic pipe 36 is lapwelded to the layer 35. In general, as illustrated in FIG. 5, the present invention is also applicable to junctions between metals and nonmetals, the transition bodies being commercially available metal-clad synthetic-resin sheets.

The above-described method of joining tubular elements (FIGS. 2–5) has been claimed in my U.S. Patent No. 3,479,730.

I claim:
1. An assembly comprising a plurality of elements of different materials, and a laminated transition body interconnecting said elements, said body having a plurality of layers in surface-contacting relationship and corresponding each to the material of a respective one of said elements, each of said layers projecting at least at one location beyond one of the remaining layers and being thermally bonded to the respective element at said location.

2. An assembly as defined in claim 1 wherein said transition body is generally tubular and said location constitutes respective extremities of said body, said elements constituting tubes bonded to the respective layers at the respective extremities.

3. An assembly as defined in claim 2 wherein at least one of said tubes is connected with the respective layer by solder.

4. An assembly as defined in claim 2 wherein at least one of said tubes is connected with the respective layer by a weldment.

5. An assembly as defined in claim 1 wherein at least one of said materials consists predominantly of aluminum and another of said material consists of nickel-chromium steel.

6. An assembly as defined in claim 5 wherein said body is seamless and is drawn from a steel-clad aluminum sheet and the layer of steel lies inwardly of the aluminum layer.

References Cited
UNITED STATES PATENTS

| | | | |
|---|---|---|---|
| 2,171,040 | 8/1939 | Merritt et al. | 29—196.2X |
| 2,216,033 | 9/1940 | Hopkins | 29—472.1 |
| 2,908,073 | 10/1959 | Dulin | 29—488 |
| 3,462,827 | 8/1969 | Winter | 29—196.2X |
| 3,462,828 | 8/1969 | Winter | 29—196.2X |

FOREIGN PATENTS

| | | |
|---|---|---|
| 145,945 | 7/1962 | U.S.S.R. |

L. DEWAYNE RUTLEDGE, Primary Examiner

E. L. WEISE, Assistant Examiner

U.S. Cl. X.R.

29—195, 196, 196.2, 196.3, 198